United States Patent [19]

Tonomura et al.

[11] Patent Number: 5,590,180
[45] Date of Patent: Dec. 31, 1996

[54] COMMUNICATION METHOD OF SUPPLYING INFORMATION IN INTELLIGENT NETWORK AND APPARATUS THEREFOR

[75] Inventors: Yukiko Tonomura; Yoshito Sakurai, both of Yokohama; Yumiko Nishi, Tokyo, all of Japan

[73] Assignee: Hitachi, Ltd., Tokyo, Japan

[21] Appl. No.: 314,373

[22] Filed: Sep. 28, 1994

[30] Foreign Application Priority Data

Sep. 30, 1993 [JP] Japan .................................. 5-244252

[51] Int. Cl.⁶ .................................................. H04M 15/00
[52] U.S. Cl. ............................ 379/112; 379/111; 379/113; 379/114; 379/115; 379/130; 379/131; 379/133
[58] Field of Search ................... 379/111–115, 130–133, 379/202, 219

[56] References Cited

U.S. PATENT DOCUMENTS

| | | | |
|---|---|---|---|
| 4,757,267 | 7/1988 | Riskin | 379/113 |
| 5,418,844 | 5/1995 | Morrisey | 379/112 |
| 5,422,941 | 6/1995 | Hasenauer | 379/112 |

*Primary Examiner*—Wellington Chin
*Assistant Examiner*—Vijay Shankar
*Attorney, Agent, or Firm*—Antonelli, Terry, Stout & Kraus

[57] ABSTRACT

A communication method and apparatus which provides information in an intelligent network. The communication method and apparatus allows a user to enter a connection number of the user terminal, a connection number of an information provider terminal and time to receive information from the information providing service into a user database provided in a transmission layer. The data registered in the user database is read into a service control database provided in the intelligent layer. The service control database is referred to in order to automatically connect the user terminal and the information providing service when a service start time is reached and automatically disconnect the connection therebetween when a service end time is reached.

11 Claims, 10 Drawing Sheets

5,590,180

COMMUNICATION METHOD OF SUPPLYING INFORMATION IN INTELLIGENT NETWORK AND APPARATUS THEREFOR

BACKGROUND OF THE INVENTION

The present invention relates to an intelligent network for providing a supplement service to a communication network including a telephone network, and more particularly to a communication method suitable for realizing a service to provide information so that home users can receive various information and an apparatus therefor.

Typical examples of prior art information providing services through a public communication network are time announcement (telephone number 117) and weather forecast (telephone number 177) through the public telephone network. In those services, dedicated circuits (called talky trunks) are provided in a switching system of the telephone network, and when a subscriber who wants the service dials a special number (for example, 117 or 177 mentioned above), the switching system operates to connect it to the dedicated circuit so that audio information such as the weather forecast sent from the dedicated circuit is directly passed to the telephone set. In order to accomplish the service, it is necessary for all of the switching systems to be provided with the dedicated circuits. When it is desired to change the content of the service, for example, when the information of the weather forecast is to be changed, the recorded content of each switching system must be changed. Accordingly, in this system, the more the number of services to be provided increases, the more difficult are the addition of new services and the change of the contents of the services.

In order to solve the above problems and permit flexible providing of various services, it has become common to construct an intelligent network. In this system, a transmission layer for transmitting audio information and an intelligent layer for transmitting control information required to realize the service are provided, and various facilities required to realize the service (for example, a database) is installed in the intelligent layer. Detail of the intelligent network is described, for example, in an article "Intelligent Network and Network Operation" (Chapter 1.3.2, pages 19–21, by Minoru Akiyama et al, Corona Publishing Co.).

An example of the services which use the intelligent network is an information providing service charged to a service provider or a so-called #800 service. In this service, the information provider contracts with a network provider to get a special number (888-xxxxxx) from the network provider. When a general telephone subscriber dials to that special number, the network provider collects a charge from the information provider rather than the subscriber who dialed (caller). In order to realize the service, the network provider installs in the intelligent layer a database for allocating a connection destination based on the special number, a database for recording the charges, a mechanism for controlling the transmission network to connect the caller to the information provider (called a connection control point) and a database for storing control information to operate the mechanism. The addition and the change of the services are readily attained by changing the contents of those databases.

An example of the intelligent network services which use the databases is disclosed in R. P. Weber U.S. Pat. No. 4,191,860 "Database Communication Call Processing Method". In the illustrated drawing of the prior art, DATABASE and STP are connected through CCIS which is a common channel signaling network to form an intelligent network.

Examples of the information services charged to the service provider would be news, more detailed weather forecast, guide to movies, recruiting information, road information and event information.

In the above prior art, when a general telephone subscriber wants to receive an information providing service, he/she dials to the information provider to get the information. For example, when he/she wants to get news of the day, he/she dials to the information provider who provides the news providing service, and when he/she then wants to get weather forecast, he/she dials to the information provider of the weather forecast. It may be convenient that desired information is available at a desired time but it takes time and handling accordingly. On the other hand, there are information providing media such as television. In this system, since the information flows in one way, it is difficult to get desired information at a desired time although it does not take much time and handling.

In general, it frequently occurs that some information is daily needed at some time in a usual life. That information and that time vary from person to person.

SUMMARY OF THE INVENTION

It is an object of the present invention to provide an information providing service which permits the acquisition of desired information at a desired time through an intelligent network in order to comply with the desire which varies from person to person, and which permits programming of the information as desired rather than fixed information such as a television program.

More specifically, a service user first registers to a network provider a program indicating a time band and a content of service he/she wants to receive (registration of program). In accordance with the program, the network provider automatically connects the designated information provider to the service user at the designated time without requiring the intervention of the service user to realize the information providing.

In order to solve the above problems, a database in which the program for the service user to acquire the information is to be registered is provided in the intelligent network comprising service control points (SCPs) for controlling the information processing and the databases, terminals of the service users, switching systems, service switching points (SSPs) for transmitting service requests provided from the service users through the switching systems to the SCPs through control signals lines such as a common channel signaling network and transmitting control commands from the SCPs to the switching system, and service management systems (SMSs) which are management systems for the SCPs and the SSPs and connected to a network management terminal through a communication network such as a packet data network for adding and changing the service functions. The service user can directly or indirectly set and/or change the data on the database. The program may be registered even when the database is provided in one or more of the SCP, the SSP and a terminal of the service user (service user terminal) in the intelligent network.

In accordance with the present invention, the service user can receive the information providing service which the service user has programmed by himself/herself.

The registration of the program is carried out in the following manner. The service user registers any number of combinations of the telephone numbers of the information providers from which he/she wants to get the information and the times at which he/she wants to receive the information services in a database for registering the program on the network.

The services are provided in the following manner. The service management system (SMS) has a service scenario which describes the definitions and procedures of the services. When the time which the service user has registered is reached, the service control point (SCP) transmits a service request to the service switching point (SSP) by the data of the program which the service user has registered. In response to the request by the SCP, the SSP connects the terminal of the service user to the information provider to start the information providing service.

DESCRIPTION OF THE PREFERRED EMBODIMENTS

The information providing network of the present invention is now explained with reference to the drawings.

In one embodiment of the present invention, a user database is installed in a storage in a service switching point (SSP) to implement the programming of an information providing service.

Figure 1:
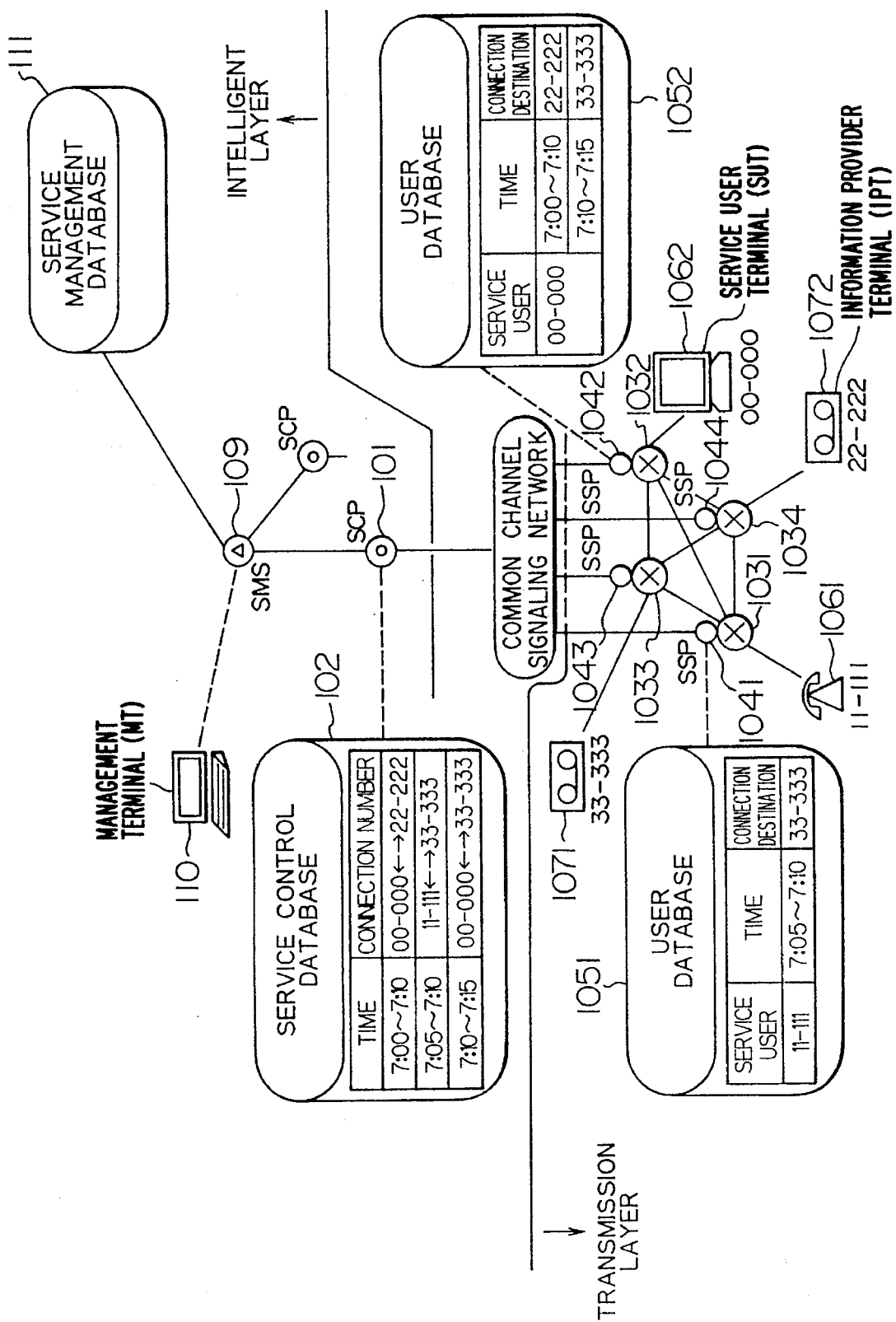
FIG. 1 shows an embodiment of an information providing network of the present invention.

FIG. 1 shows a configuration of an information providing network. In FIG. 1, numeral 101 denotes a service control point (SCP), numeral 102 denotes a service control database provided in a storage in the SCP, numerals 1031~1034 denote switching systems, numerals 1041~1044 denote service switching points (SSP's), numerals 1051~1052 denote user databases, numerals 1061~1062 denote service user terminals, numerals 1071~1072 denote information provider terminals, numeral 109 denotes a service management system (SMS), numeral 110 denotes a network management terminal, and numeral 111 denotes a service management database provided in a storage of the SMS 109. In FIG. 1, the SCP 101, the service control database 102, the SMS 109, the network management terminal 110 and the service management database 111 belong to an intelligent layer, and the switching systems 1031~1034, the SSP's 1041~1044, the user databases 1051~1052 in the SSP's, the service user terminals 1061~1062 and the information provider terminals 1071~1072 belong to a transmission layer.

The network manager can set and change the data of the databases in the SMS 109 through the network management terminal 110. A plurality of SCP's are provided and they are connected by the network.

Figure 2:
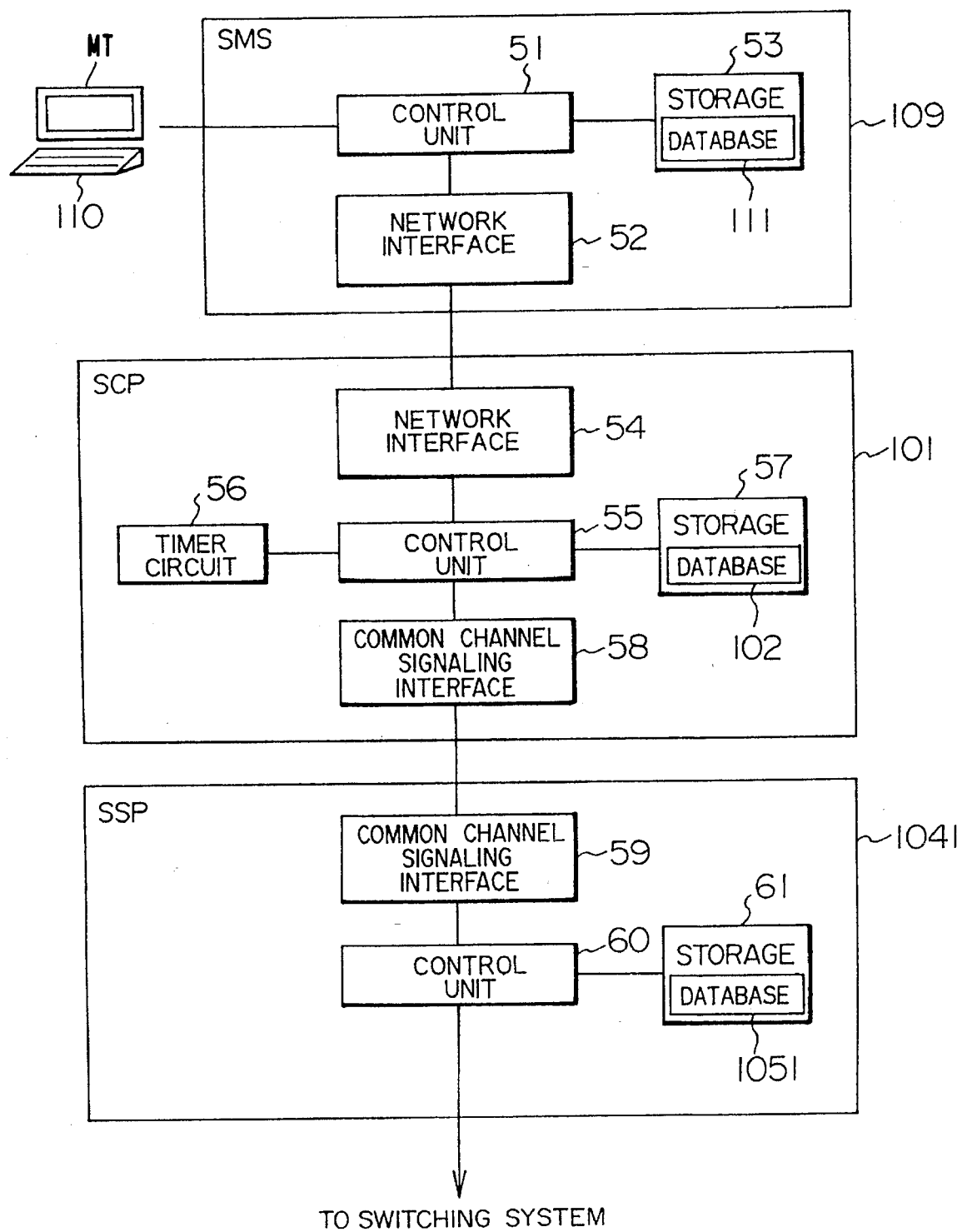
FIG. 2 shows a block diagram of hardware of FIG. 1.

FIG. 2 shows a block diagram of hardware of the SMS 109, the SCP 101 and the SSP 104.

In FIG. 2, the SMS 109 comprises a control unit 51 including a CPU for controlling an overall operation of the SMS, a storage 53 and an interface 52 for the connection with the network in the intelligent layer. The service management database 111 is provided in the storage 53. The control unit 51 is connected to the network management terminal 110.

The SCP 101 comprises an interface 54 for the connection with the network in the intelligent layer, a control unit 55 including a CPU for controlling an overall operation of the SCP, a timer circuit 56 for collating a current time to a service providing time, a storage 57 and a common channel signaling interface 58 for the connection with a common channel signaling network. The service control database 102 is provided in the storage 57.

The SSP 1041 comprises a common channel signaling interface 59 for the connection with the common channel signaling network, a control unit 60 including a CPU for controlling an overall operation of the SSP and a storage 61. The user database 1051 is provided in the storage 61 and the control unit 60 is connected to the switching systems.

Figure 3:
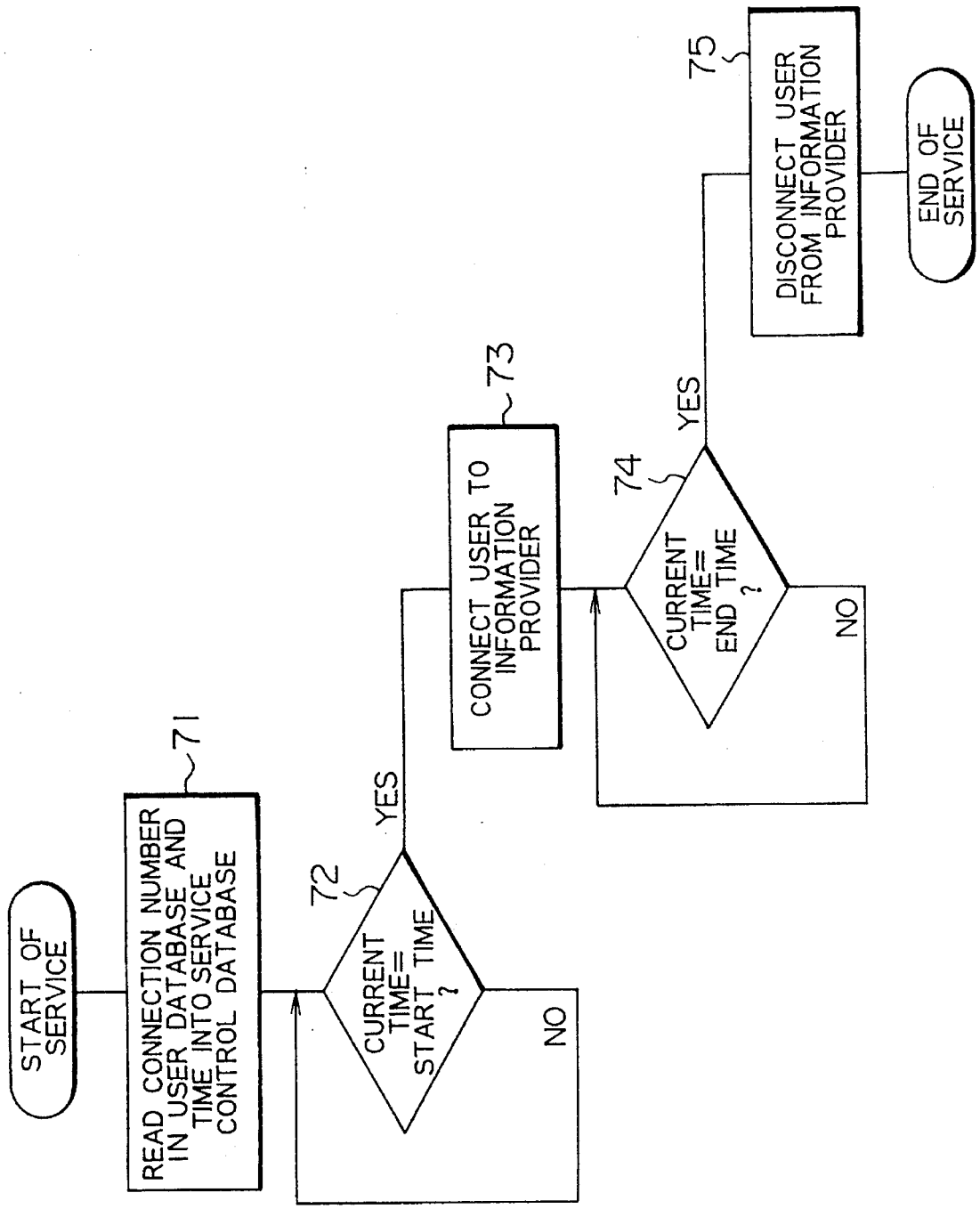
FIG. 3 shows a flow chart of a service scenario used in the information providing network of FIG. 1.

FIG. 3 shows a service scenario in the service management database 111. The service scenario is also programmed with the same content in the service control database, for example, 102, in the SCP which is under the control of the SMS 109, and when the service scenario in the service management database 111 is changed by a command from the network management terminal 110, the service scenario in the SCP is also automatically changed in the same manner. The SCP issues a connection operation command to a subsidiary node in accordance with the service scenario.

The flow of the service scenario of FIG. 3 is explained below.

In a step 71, the connection number and the time registered in the user database are read into the service control database in the SCP.

In a step 72, a current time is continuously collated to the service start time by the timer circuit in the SCP.

In a step 73, when the service start time is reached, the lines of service user and the information provider are connected.

In a step 74, a current time is continuously collated to the service end time by the timer circuit in the SCP.

In a step 75, when the service end time is reached, the lines of the service user and the information provider are disconnected.

Figure 4:
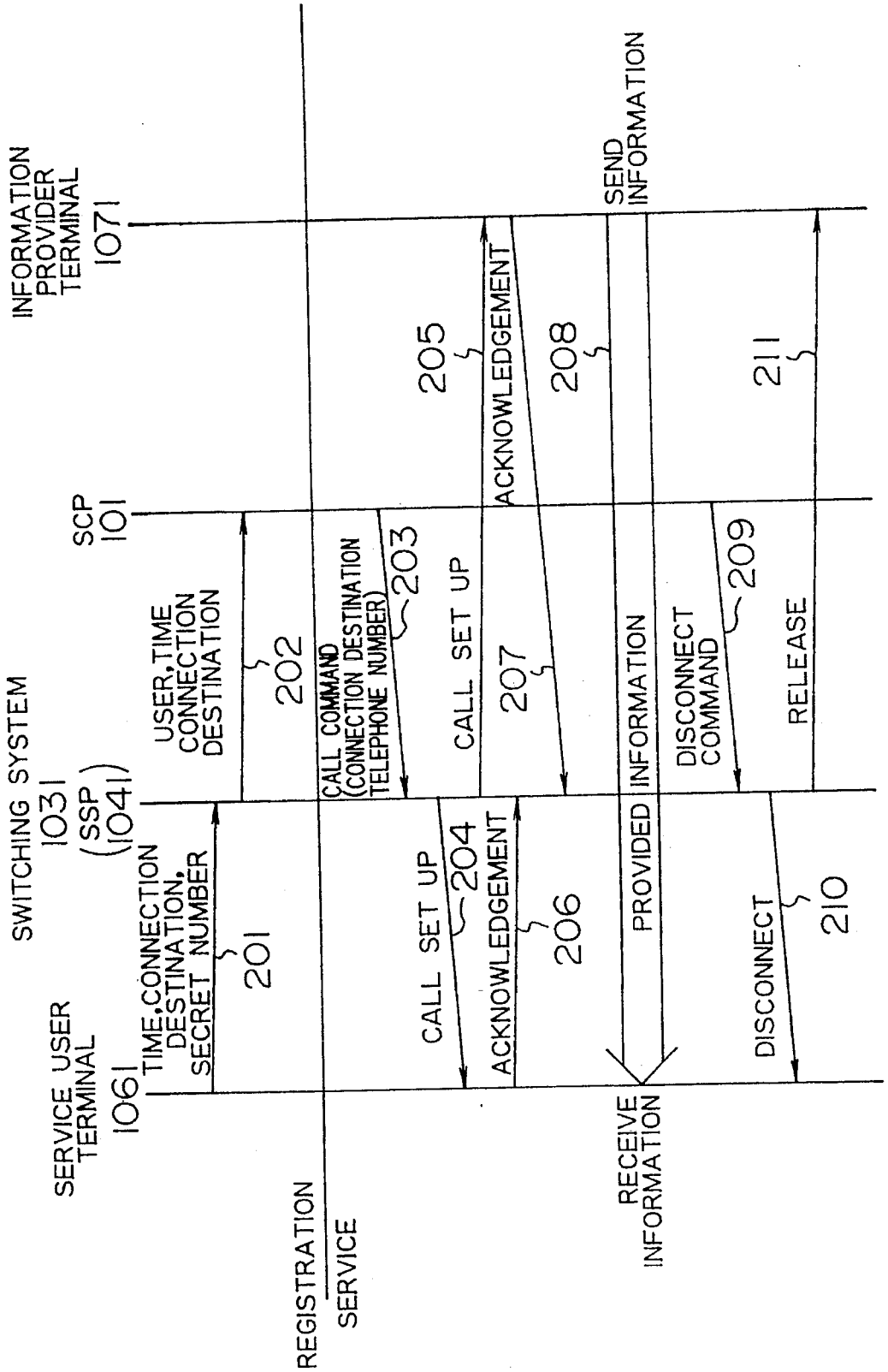
FIG. 4 shows an operation sequence of the information providing network of FIG. 1.

FIG. 4 shows an operation sequence of the information providing network of the invention. The operation is now explained.

In FIG. 1, the service user registers the connection number (usually a telephone number) which is the terminal number of the information provider and the start and end times of information providing on the user database 1051 through the service user terminal 1061 (201 in FIG. 4). To register them, a special number for the registration is predetermined and the service user dials that number and interactively registers the program. In order to prevent unauthorized third parties from using the service or accessing to the user database without permission, a secret number preset by the service user may be required in the registration. The user database stores the service registration status for each service user as shown in FIG. 1. For example, the user of the terminal 1061 may register the service user telephone number 11-111, the desired service time 7:05 to 7:10 and the connection destination telephone number 33-333.

The SCP 101 reads in the data of the user databases 1051~1052 in the subsidiary SSPs in a step 71 of FIG. 3 (202 in FIG. 2), applies necessary conversion thereto and holds the data on the service control database 102 as shown in FIG. 1. The service control database 102 holds the registration data by sorting it in the order of service start time, for example, to facilitate the connection of the terminal.

The SCP 101 has timer circuit 56 which collates the current time to the service start time registered on the service control database 102 in a step 72, and when the designated time is reached, the SCP 101 transfers the connection number or the telephone number of the service user terminal and the telephone number of the information provider terminal to the SSP which is located at the same position as that of the switching system to which the service user terminal is connected. For example, when the current time is 7:05, the SCP 101 transfers the information required for the connection to the SSP 1041 to command the connection thereof (203 in FIG. 2). The SSP 1041 calls both the service user terminal 1061 and the information provider terminal 1071 by the command from the SCP 101 (204 and 205 in FIG. 4), and after the acknowledgements by the both terminals (206 and 207 in FIG. 4), it connects the both terminals (208 in FIG. 4). Then, the SCP 101 collates the current time to the service end time by the timer circuit 56 in a step 74, and when the service end time is reached, the SCP 101 issues a disconnection command in a step 75 (209 in FIG. 4) and the SSP 1041 releases the line connection (210 and 211 in FIG. 2). When the service user wants to change the program content such as the time to acquire the information or the connection destination, he/she may change the content of the user database from the service user terminal in the same manner as that for the registration.

The registration of the program may be changed not only through the service user terminal 1061 but also by any one of the terminals in the network which has a required function.

In the present embodiment, since the user database which may be directly accessed by the service user is provided in each SSP which accommodates that service user, the management is facilitated.

Further, since the service user does not directly access to the network resources such as the service management database and the service control database, there is no risk of destroy of the network resources by the misoperation of the service user. On the other hand, the SCP has the database for the control of the service of the network. The data may be duplicate with that of the user database but since the control of the overall network is necessary to provide the service, the exchange of the data in the low level layer does not frequently occur by the provision of the data in the high level layer and the efficiency is improved.

In another embodiment of the present invention, a user database is installed in a terminal to implement the information providing service.

Figure 5:
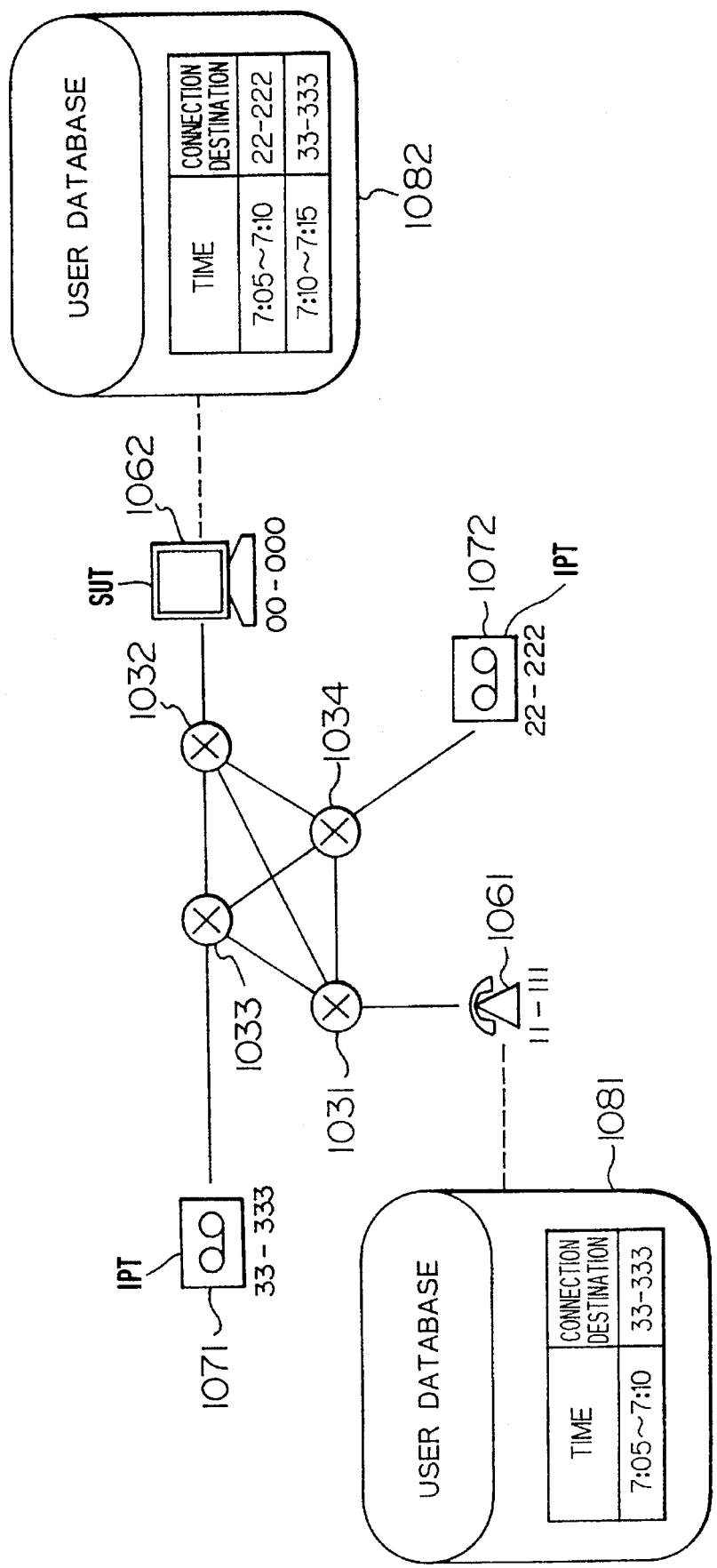
FIG. 5 shows another embodiment of the information providing network of the present invention.

FIG. 5 shows a configuration of the information providing network in this embodiment. In FIG. 5, numerals 1031~1034 denote switching systems, numerals 1061~1062 denote service user terminals, numerals 1071~1072 denote information provider terminals, numerals 1081~1082 denote user database added to the service user terminals.

Figure 6:
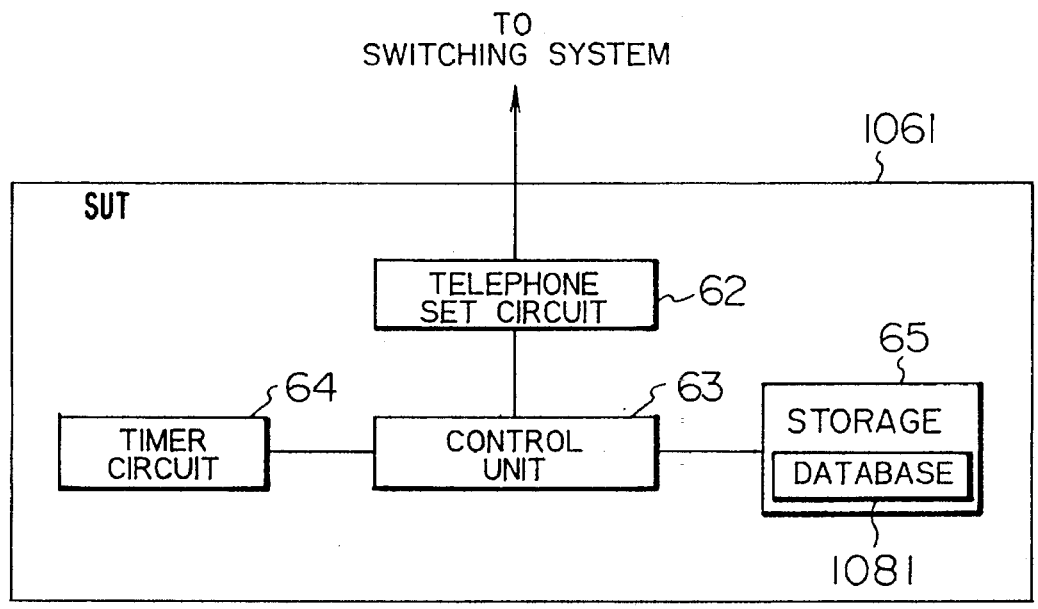
FIG. 6 shows a block diagram of hardware of a terminal of FIG. 5.

FIG. 6 shows a block diagram of hardware of the service user terminal 1061.

The service user terminal 1061 comprises a telephone set circuit 62, a control unit 63, a timer circuit 64 and a storage 65. The control unit 63 is connected to other units in the terminal and controls the function of the terminal by a CPU. The telephone set circuit 62 is connected to the external switching system. The timer circuit 64 collates the current time to the service start time and the service end time. The storage 65 is provided with a user database 1081.

Figure 7:
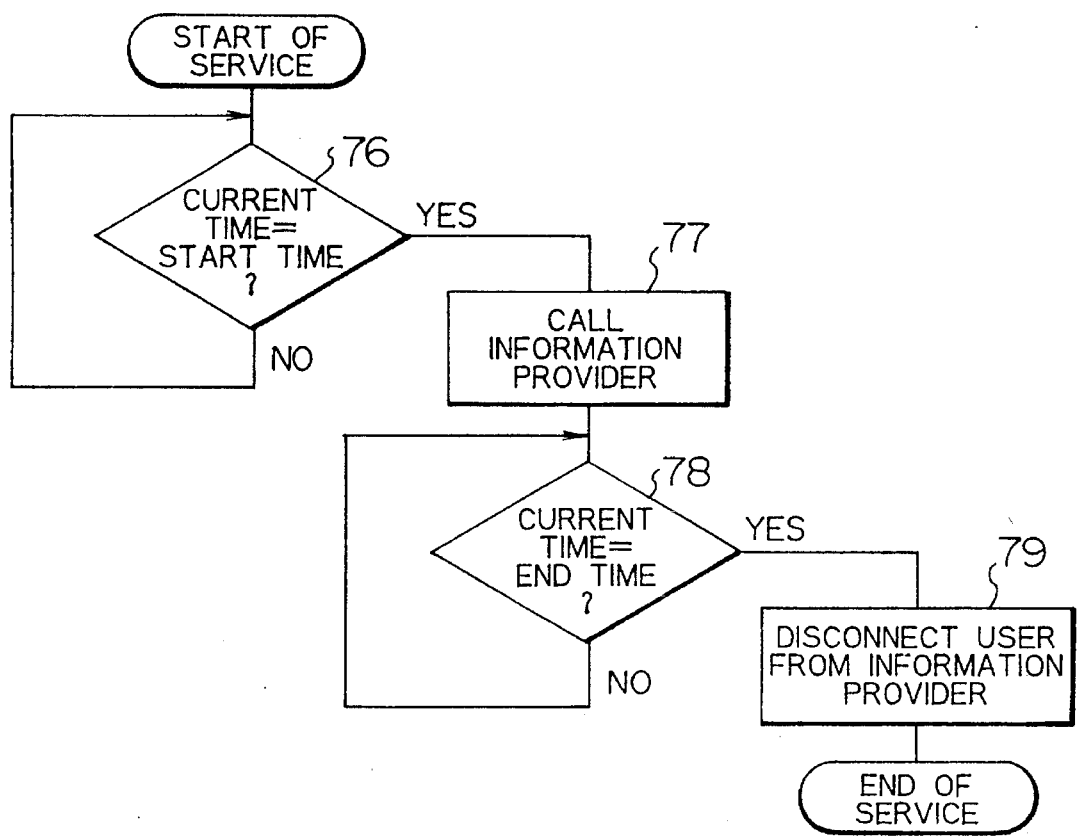
FIG. 7 shows a flow chart of a service scenario used in the information providing network of FIG. 5.

FIG. 7 shows a service scenario provided in the user database 1081. The service user terminal 1061 issues a connection command for the service providing in accordance with the service scenario.

A flow of the service scenario of FIG. 7 is explained below.

In a step 76, the current time is continuously collated to the service start time by the timer circuit 64.

In a step 77, when the service start time is reached, the information provider terminal 1071 is called to connect the line.

In a step 78, the current time is continuously collated to the service end time.

In a step 79, when the service time is reached, the line between the user and the information provider 1071 is disconnected.

Figure 8:
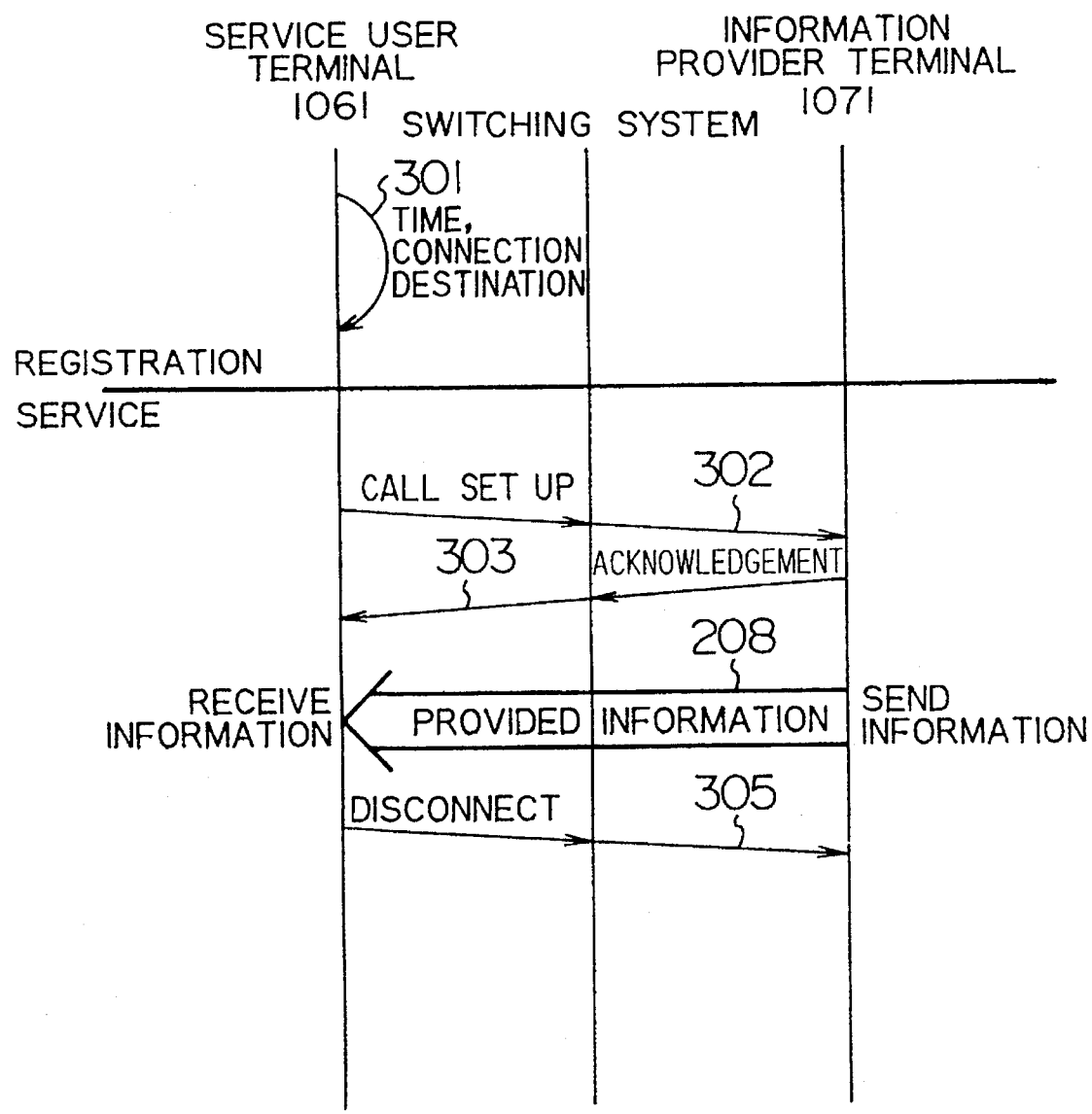
FIG. 8 shows an operation sequence of the information providing network of FIG. 5.

FIG. 8 shows an operation sequence of the present embodiment.

The service user registers the connection destination number (usually a telephone number) which is the terminal number of the information provider and the desired service time on the user database 1081 (301 in FIG. 8). When the designated time is reached, the terminal 1061 automatically calls the information provider 1071 in steps 76 and 77 of FIG. 7 (302 in FIG. 8). By the acknowledgement of the information provider 1071 (303 in FIG. 8), the service user can acquire the desired information (208 in FIG. 8). When the designated service end time is reached, the terminal 1061 disconnects the call in steps 78 and 79 (305 in FIG. 8).

In accordance with the present embodiment, the intelligent layer is not required and each service user terminal need only maintain the data of its own and the improvements is attained in terms of both security and economy.

Figure 9:
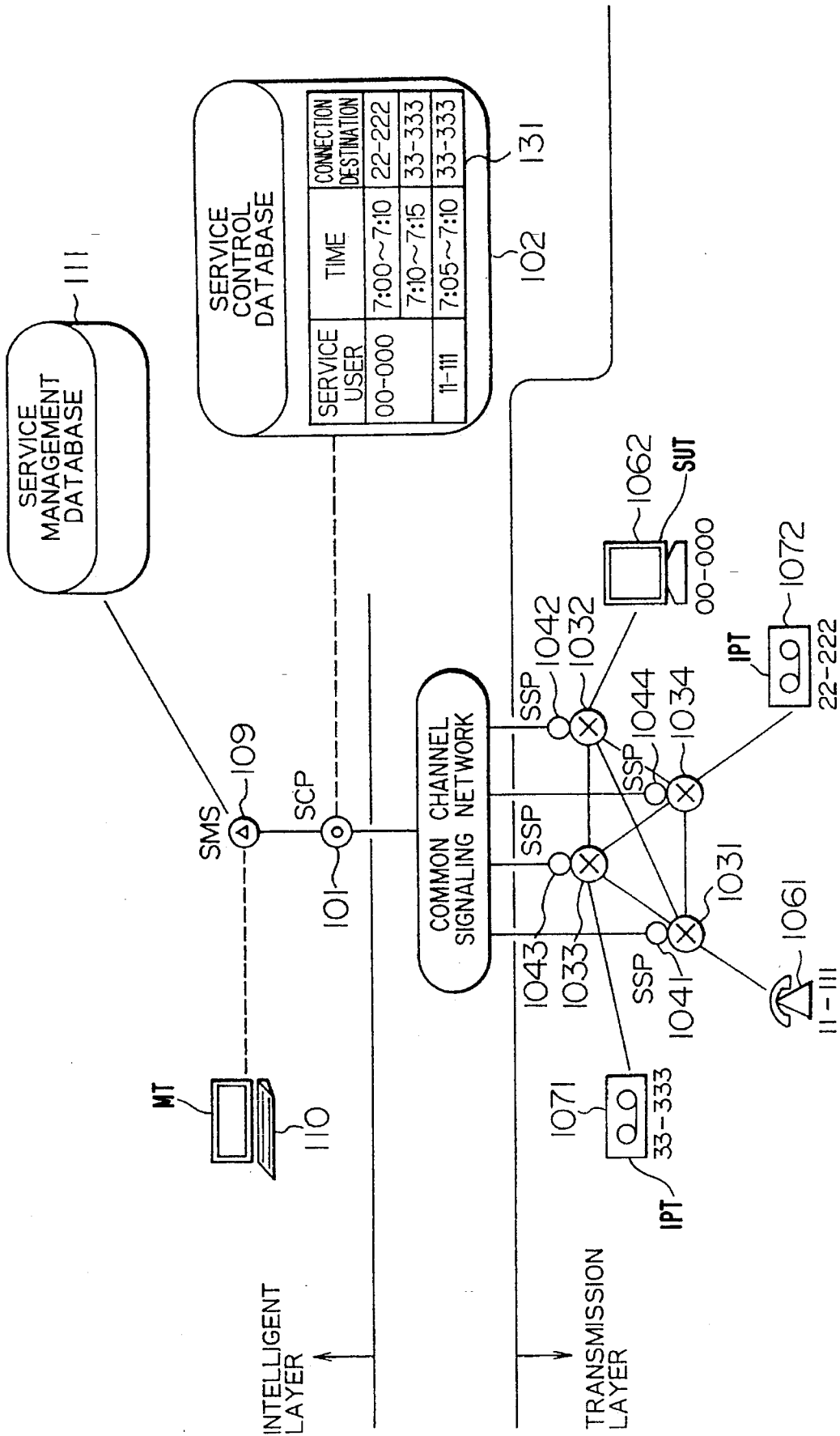
FIG. 9 shows other embodiment of the information providing network of the present invention.

FIG. 9 shows a configuration of yet another embodiment of the information providing network of the present invention.

In the present embodiment, a database is provided in only the intelligent layer of the intelligent network.

The configuration of the network of the transmission layer is identical to that of FIG. 1 and the like elements are designated by the like numerals. The configuration of the hardware of the SMS and the SCP are identical to that of FIG. 2 except the contents of the databases. The service control database 102 is provided with a table 131 in which the telephone numbers of the service users, the service providing times and the telephone numbers of the service providers are registered.

Figure 10:
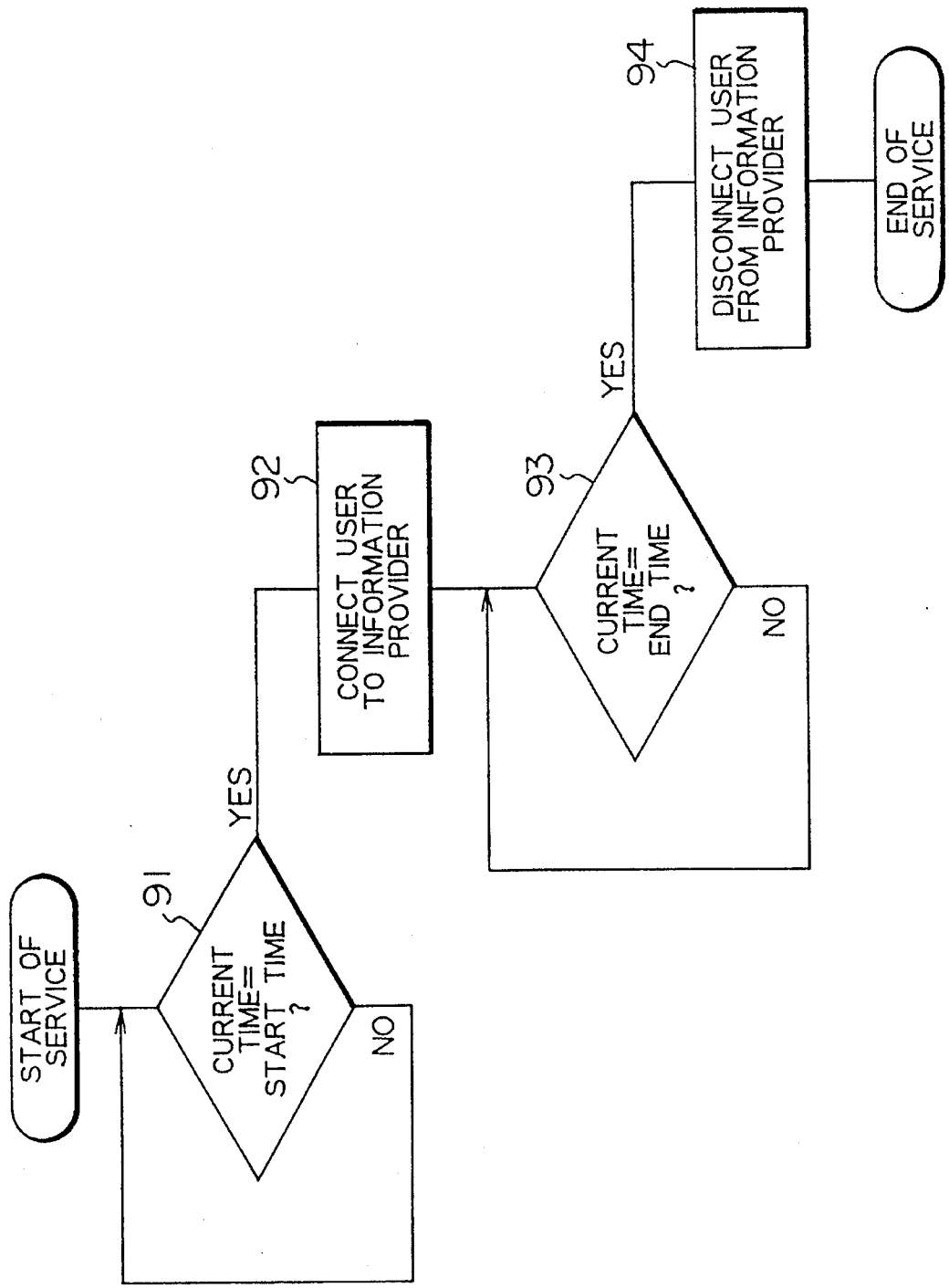
FIG. 10 shows a flow chart of a service scenario used in the information providing network of FIG. 9.

FIG. 10 shows a flow chart of the service scenario of the embodiment of FIG. 9. The identical content of the service scenario is written in the databases of the SMS and the SCP, and when the service scenario in the SMS is changed by the network management terminal 110, the service scenario in the SCP is also changed.

A flow of the service scenario of FIG. 10 is explained below.

The current time is collated to the service start time by the timer 56 (FIG. 4) (step 91), and when the service start time is reached, the line between the user and the information provider is connected (step 92). Then, the current time is collated to the service end time by the timer 56 (step 93), and when the service end time is reached, the line between the user and the information provider is disconnected (step 94) to terminate the service.

Figure 11:
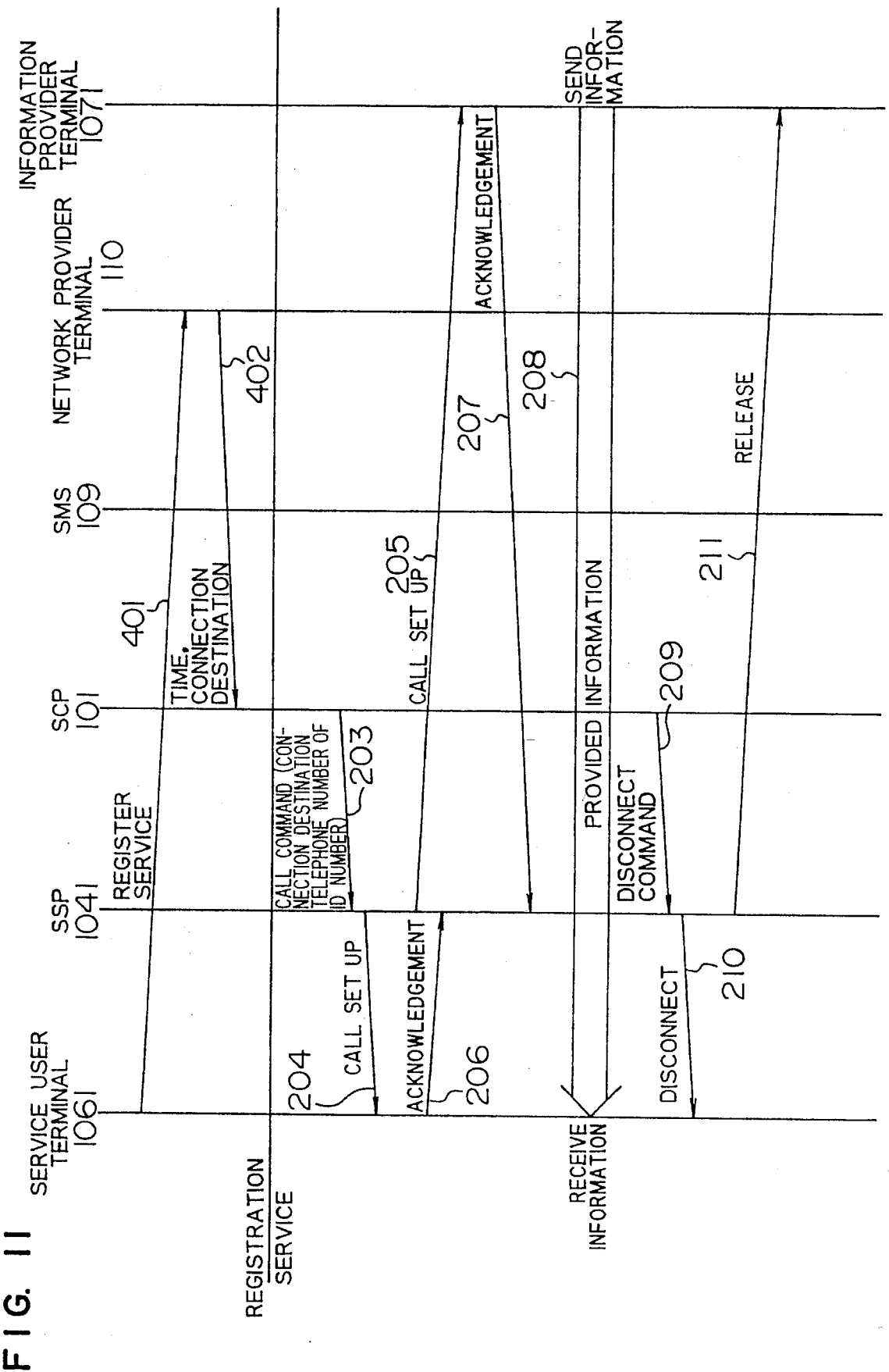
FIG. 11 shows an operation sequence of the information providing network of FIG. 9.

FIG. 11 shows an operation sequence of the information providing network carried out in accordance with the service scenario of FIG. 10.

The service user dials to the network provider to report his/her telephone number or identification number, the desired service time and the desired information provider number (401). The network provider registers the content of the report in the table 131 on the service control database 102 in the SCP 101 through the SMS 109 by the network management terminal 110 (402).

The SCP 101 collates the current time to the service start time in the step 91, and when the service start time is reached, it sends the terminal number of the service user and the terminal number of the information provider to the SSP 101 to which the service user terminal is connected in the step 92 (203). In response to the call command, the switching system connects the service user terminal 1061 and the information provider terminal 1071 (204 to 208). The SCP 101 collates the current time to the service end time in the step 93, and when the service end time is reached, it issues a line disconnect command to the SSP 101 (209). In response to the disconnect command, the switching system disconnects the line (210, 211).

In accordance with the present embodiment, the databases may be centrally installed and efficient and economic service can be provided in a small scale network.

In the above embodiments, a sequence of the termination of the service in response to the disconnection of the line from the information provider may be included.

In the above embodiments, the network is constructed to provide the information providing services such that at least one database which allows the programmed edition of the information providers and the information providing times by the service user or the network provider is arranged in the intelligent network so that the service user can get the desired information at the desired time. The present invention is not restricted by the information to be served (the transmission rate and the content) and the facilities of the communication network (the switching system and the transmission apparatus), and it is applicable from the low speed narrow band communication such as an audio providing service such as the weather forecast to high speed wide band communication such as a multimedia information providing service including video image and voice. For example, in the embodiments, the service user terminal may be a multimedia information terminal or a television set, the information provider may be a cable television company who provides multi-channel programs and the switching system and the transmission facilities may be ATM telecommunication apparatus suitable for high speed broad band communication so that a video on-demand service (for example, disclosed in Nikkei Electronics, No. 574, pages 102~107, Feb. 15, 1993) which has recently been demanded in the CATV service can be readily realized on the public telecommunication network without requiring dedicated facilities and economic information providing service is attained.

What is claimed is:

1. A communication method for providing information in an intelligent network including a transmission layer having a user terminal and a switching system connected through a first network and an intelligent layer connected to said transmission layer through a second network for issuing a connection command of a line to said transmission layer, comprising the steps of:

entering by a user a connection number of the user terminal, a connection number of an information provider terminal and a time to receive an information providing service into a user database provided in said transmission layer;

reading data registered in said user database into a service control database provided in said intelligent layer;

collating a current time with the time to receive the information providing service read in said service control database by a timer circuit provided in said intelligent layer;

automatically connecting said user terminal to said information provider terminal when a service start time is reached as a result of the collation;

collating a current time with a service end time by said timer circuit; and automatically disconnecting the connection between said user terminal and said information provider terminal when the service end time is reached as a result of the collation.

2. A communication method for providing information in an intelligent network according to claim 1 wherein said step of reading the data registered in said user database includes a step of sorting the data in the order of the service start time.

3. A communication method for providing information in an intelligent network comprising the steps of:

entering by a user a connection number of an information provider terminal and a time to receive an information providing service into a user database provided in a user terminal;

collating a current time with a service start time by a timer circuit provided in said user terminal;

automatically connecting said user terminal to said information provider terminal when the service start time is reached as a result of the collation;

collating a current time with a service end time by said timer circuit; and automatically disconnecting the connection between said user terminal and said information provider terminal when the service end time is reached as a result of the collation.

4. A communication method for providing information in an intelligent network including a transmission layer having a user terminal and a switching system connected through a first network and an intelligent layer connected to said transmission layer through a second network for issuing a connection command of a line to said transmission layer, comprising the steps of:

informing by a user to a network provider a connection number of the user terminal, a connection number of an information provider terminal and a time to receive an information providing service into a user database provided in said transmission layer;

registering by said network provider in a service control database provided in said intelligent layer the connection number of said user terminal, the connection number of said information provider and the time to receive the information providing service;

collating a current time with a service start time registered in said service control database by a timer circuit provided in said intelligent layer;

automatically connecting the user terminal to said information provider terminal when the service start time is reached as a result of the collation;

collating a current time with a service end time by said timer circuit; and automatically disconnecting the connection between said user terminal and said information provider terminal when the service end time is reached as a result of the collation.

5. A communication method for providing information in an intelligent network according to claim 4 wherein said step of registering into said service control database includes a step of sorting the data in the order of the service start time.

6. A communication apparatus for providing information in an intelligent network comprising:

a user terminal connected to a switching system;

first control means provided in a transmission layer including a user database accessible by a user and having a connection number of said user terminal, a connection number of an information provider terminal and a time to receive an information providing service registered therein;

second control means including a service control database provided in an intelligent layer and containing data of said user database, means for collating a current time with the time to receive the information providing service by referring said service control database, and means for automatically commanding to said switching system the connection of said user terminal and said information provider terminal when a service start time is reached as a result of a collation by said collation means and automatically disconnecting said connection when a service end time is reached; and third control means provided in said intelligent layer and connected to a network provider terminal and including a service management database for controlling the issuance of a connection command to a subsidiary node by said second control means.

7. A communication apparatus for providing information in an intelligent network according to claim 6 wherein said service control database includes a memory storing the data in said user database sorted in the order of the service start time.

8. A communication terminal comprising:

means connected to a switching system for functioning as a telephone set;

a database having a connection number of an information provider terminal and a time to receive an information providing service recorded therein;

means for collating a current time with the time to receive the information providing service; and means for automatically commanding to said switching system the connection with said information provider terminal when a service start time is reached as a result of a collation by said collation means and automatically commanding to said switching system the disconnection of said connection when a service end time is reached.

9. A communication apparatus for providing information in an intelligent network comprising:

a communication terminal including means connected to a switching system for functioning as a telephone set, a database having a connection number of an information provider terminal and a time to receive an information providing service recorded therein, means for collating a current time to the time to receive the service, and means for automatically commanding to said switching system the connection with said information provider terminal when a service start time is reached as a result of a collation by said collation means and automatically commanding to said switching system the disconnection of said connection when a service end time is reached;

a switching system connected to said communication terminal;

first control means provided in an intelligent layer and including a database having a number to which a charge is to be charged and the connection number of the information provider terminal registered therein; and second control means provided in said intelligent layer and connected to a network provider terminal and including a service management database for controlling an issuance of a connection command to a subsidiary node by said first control means.

10. A communication apparatus for providing information in an intelligent network comprising:

a user terminal connected to a switching system;

first control means including a service control database provided in an intelligent layer and having a connection number of said user terminal, a connection number of an information provider terminal and a time to receive an information providing service recorded therein, means for collating a current time to the time to receive the service, and means for automatically commanding to said switching system the connection of said user terminal and said information provider terminal when a service start time is reached as a result of a collation by said collation means and automatically commanding the disconnection of said connection when a service end time is reached; and second control means provided in said intelligent layer and connected to a network provider terminal and including a service management database for controlling an issuance of a connection command to a subsidiary node by said first control means.

11. A communication apparatus for providing information in an intelligent network according to claim 10 wherein said service control database includes a table having the connection number of said user terminal, the connection number of said information provider terminal and the time to receive the information providing service registered therein and sorted in the order of the service start time.

* * * * *